(12) United States Patent
Cederström et al.

(10) Patent No.: US 12,453,520 B2
(45) Date of Patent: Oct. 28, 2025

(54) SYSTEMS AND METHODS FOR CT DETECTOR CALIBRATION USING A WIRE PHANTOM

(71) Applicant: GE Precision Healthcare LLC, Wauwatosa, WI (US)

(72) Inventors: Björn Cederström, Stockholm (SE); Changlyong Kim, Waukesha, WI (US); Jiayin Ling, Waukesha, WI (US); Ronald G. Kulas, Waukesha, WI (US); Jingyi Liang, Waukesha, WI (US); Mark Adamak, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 235 days.

(21) Appl. No.: 18/313,820

(22) Filed: May 8, 2023

(65) Prior Publication Data
US 2024/0374223 A1   Nov. 14, 2024

(51) Int. Cl.
*A61B 6/03* (2006.01)
*A61B 6/58* (2024.01)
*G01N 23/046* (2018.01)

(52) U.S. Cl.
CPC .............. *A61B 6/032* (2013.01); *A61B 6/583* (2013.01); *G01N 23/046* (2013.01); *G01N 2223/3035* (2013.01); *G01N 2223/419* (2013.01)

(58) Field of Classification Search
CPC ....... A61B 6/5205; A61B 6/032; A61B 6/583; A61B 6/58; A61B 6/405; A61B 6/482;
(Continued)

(56) References Cited

U.S. PATENT DOCUMENTS 4,872,188 A   10/1989  Lauro
7,006,594 B2   2/2006  Chell et al.
(Continued)

FOREIGN PATENT DOCUMENTS

CN    104306013 B   8/2016
JP    2007215698 A   8/2007
(Continued)

OTHER PUBLICATIONS

Anam, C. et al., "Automated MTF measurement in CT images with a simple wire phantom," Polish Journal of Medical Physics And Engineering, vol. 25, No. 3, Aug. 2019, 10 pages.
(Continued)

*Primary Examiner* — Irakli Kiknadze
(74) *Attorney, Agent, or Firm* — McCoy Russell LLP

(57) ABSTRACT

Systems and methods are provided for calibrating computed tomography (CT) system. In one example, a method for a computed tomography (CT) system comprises, during a calibration of the CT system, measuring a position of a detector element of a detector array of the CT system using a wire of a wire phantom coupled to a table of the CT system, during a rotational scan performed using the CT system; and during a subsequent scan performed on a subject using the CT system, applying the measured position of the detector element rather than a design target position of the detector element during reconstruction of an image from projection data acquired via the CT system; and displaying the reconstructed image on a display device of the CT system.

20 Claims, 12 Drawing Sheets

(58) Field of Classification Search
CPC ..... A61B 6/4035; A61B 6/502; A61B 5/7289; A61B 6/5288; A61B 6/541; A61B 5/7292; A61B 6/03; A61B 6/06; A61B 6/4233; A61B 6/5258; A61B 6/585; A61B 6/4241; A61B 6/481; A61B 6/5282; A61B 6/00; A61B 6/037; A61B 6/584; A61B 6/4085; A61B 6/025; A61B 6/4441; A61B 6/12; A61B 6/466; A61B 6/501; A61B 6/425; A61B 6/4092; A61B 6/5247; A61B 6/505; A61B 6/08; A61B 34/20; A61B 5/0077; A61B 6/5241; A61B 34/30; A61B 6/582; A61B 2034/2065; A61B 2090/3764; G01N 23/046; G01N 2223/3035; G01N 2223/419; G01N 23/10; G01N 23/087; G01N 23/04; G01N 2223/3308; G01N 2223/5015; G01N 2223/1016; G01N 2223/643; G01N 2223/401; G01N 2223/206; G01N 2223/424; G01N 2223/04; G01N 2223/41; G01N 2223/3307; G01N 2223/639; G01N 23/083; G01N 2223/303; G01T 7/005; G01T 1/29; G01T 1/1648; G01T 1/2985; G01V 5/224; G01V 5/22; G01V 5/20; G01V 5/232; G01V 5/271; H01J 35/28; H01J 35/101; H01J 35/305; H01J 35/153; H01J 2235/088; H01J 2235/1006; H04N 5/3205; H04N 25/00; H04N 13/254; H05G 1/26; G21K 1/02; F04C 2270/041; G06T 11/005; G06T 11/006; G06T 2211/424; G06T 2207/10081; G06T 7/80; G06T 7/73; G06T 7/60; G06T 2207/30204; G06T 7/521; G06T 2207/30004; G06T 2207/10024

USPC .......................................................... 378/207

See application file for complete search history.

(56) References Cited

U.S. PATENT DOCUMENTS

| | | | | |
|---|---|---|---|---|
| 7,125,166 | B2 * | 10/2006 | Eck | A61B 6/583 |
| | | | | 378/207 |
| 7,147,373 | B2 * | 12/2006 | Cho | A61N 5/1049 |
| | | | | 378/207 |
| 7,950,849 | B2 * | 5/2011 | Claus | A61B 6/583 |
| | | | | 378/207 |
| 9,146,327 | B2 | 9/2015 | Suppes et al. | |
| 2003/0095693 | A1 | 5/2003 | Kaufman | |
| 2005/0094771 | A1 * | 5/2005 | Basu | A61B 6/032 |
| | | | | 378/207 |
| 2008/0253510 | A1 | 10/2008 | Liu | |
| 2017/0269234 | A1 | 9/2017 | Sjolin | |

FOREIGN PATENT DOCUMENTS

| | | |
|---|---|---|
| JP | 4045442 B2 | 2/2008 |
| JP | 4374753 B2 | 12/2009 |
| JP | 2018529431 A | 10/2018 |

OTHER PUBLICATIONS

EP application 24170460.0 filed Apr. 16, 2024—extended Search Report issued Jul. 23, 2024; 13 pages.

JP application 2024-067121 filed Apr. 18, 2024—Office Action issued Apr. 23, 2025; Machine Translation; 6 pages.

* cited by examiner

SYSTEMS AND METHODS FOR CT DETECTOR CALIBRATION USING A WIRE PHANTOM

TECHNICAL FIELD

Embodiments of the subject matter disclosed herein relate to computed tomography (CT) imaging systems, and in particular, calibration of CT imaging systems using a wire phantom.

BACKGROUND

In computed tomography (CT) imaging systems, an electron beam generated by a cathode is directed towards a target within an x-ray tube. A fan-shaped or cone-shaped beam of x-rays produced by electrons colliding with the target is directed towards a subject, such as a patient. After being attenuated by the object, the x-rays impinge upon an array of radiation detector elements. An electrical signal is generated at each detector element, and the electrical signals generated at the detector elements are used to reconstruct an image of the object, where each electrical signal corresponds to a voxel/pixel of the image.

A quality of the image in terms of resolution, contrast-to-noise ratio, and other factors may depend on an alignment of each detector element within the detector arrays. Misalignments of the detector elements may increase a number of artifacts in the image and/or reduce the quality of the image. The misalignments may be measured and corrected using mechanical alignment techniques. The mechanical alignment techniques may use several kinds of measurement methods, such as using positioning tools with contact and/or laser. Based on measurement data, the detector elements can be realigned using a set of mechanical tools. However, current capabilities for alignment may not be feasible for newer versions of CT systems including smaller detector elements, which may require less than 10 um alignment accuracy.

SUMMARY

The current disclosure at least partially addresses one or more of the above identified issues by a method for a computed tomography (CT) system comprising, during a calibration of the CT system, measuring a position of a detector element of a detector array of the CT system using a wire of a wire phantom coupled to a table of the CT system, during a rotational scan performed using the CT system; and during a subsequent scan performed on a subject using the CT system, applying the measured position of the detector element rather than a design target position of the detector element during reconstruction of an image from projection data acquired via the CT system; and displaying the reconstructed image on a display device of the CT system. The measured detector positions may be calculated for each detector element of each detector array of the CT system and stored as a calibration vector in a memory of the CT system. The calibration vector may be used for a mechanical adjustment of gross detector misalignments to a precision limit of the mechanical adjustment (e.g., greater than 20 um). The calibration vector may also be applied to outputs of the detector elements during image reconstruction, to correct for misalignments of the detector elements below the precision limit. For example, portions of the detector elements may become misaligned prior to or during an installation of the CT system, or after replacing inoperable portions of a detector array.

By applying the measured detector position rather than the target design position to subsequent scans on subjects, an image quality of resulting reconstructed images may be increased. An advantage of the method described above is that the measured detector position values are calculated using projection geometry, based on measuring a position of each detector with respect to a known reference point (e.g., the wire) at different view angles, and applied to image reconstruction, as opposed to solely relying on limited mechanical alignment techniques to adjust the alignment of the detector elements. As a result, the method may be applied to detector arrays including smaller detector elements than can be aligned using the mechanical alignment techniques.

Further, elimination of other high precision mechanical adjustment and related calibration vectors and processes may reduce a calibration time, resources, and cost of the CT system, making the CT system more efficient. Thus, a functioning of the CT system may be improved, leading to reduced down time and faster and more accurate processing during calibration and during examinations performed using the CT system. Further, higher quality images may be generated by the CT system as a result of applying the calibration method described herein, which may result in a higher percentage of successful diagnoses and desirable patient outcomes.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
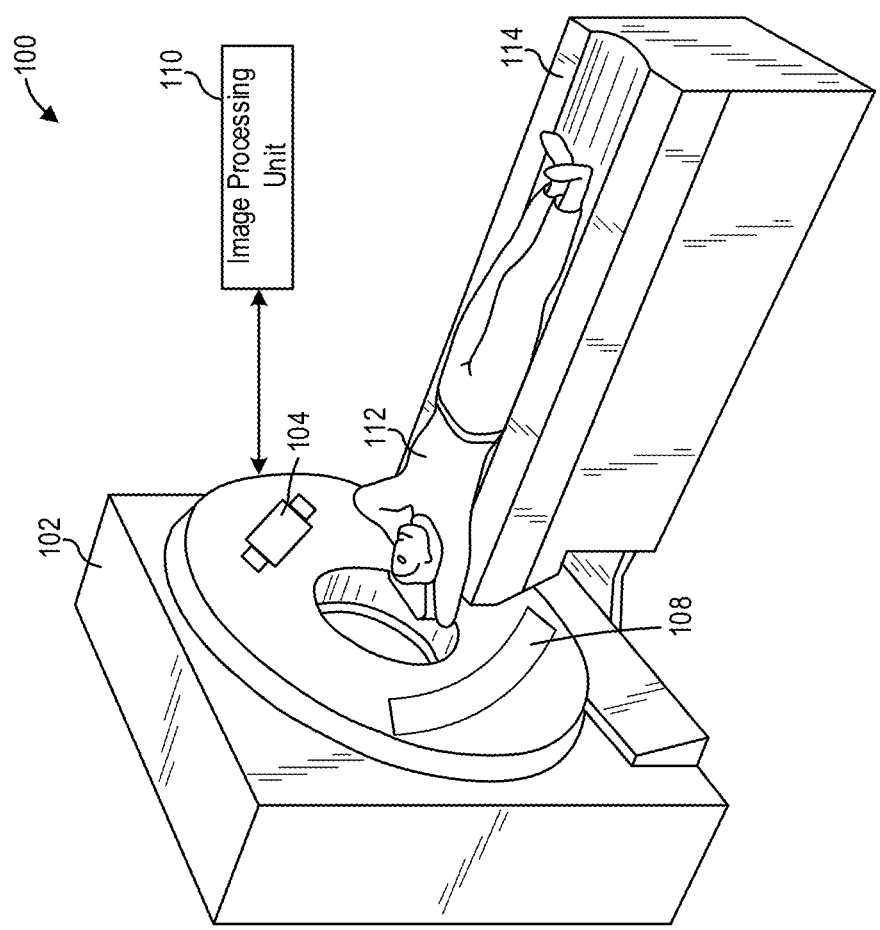
FIG. 1 shows a pictorial view of a CT imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to methods and systems for increasing a quality of images acquired via a computed tomography (CT) system. Typically, in computed tomography (CT) imaging systems, an x-ray source emits a fan-shaped beam or a cone-shaped beam towards an object, such as a patient. X-rays emitted by the x-ray source are attenuated to varying degrees by the object prior to being detected by radiation detector elements arranged in one or more detector arrays. In CT systems, the x-ray source and the detector arrays are generally rotated about a gantry within an imaging plane and around the patient, and images are generated from projection data at a plurality of views at different view angles. For example, for one rotation of the x-ray source, 1000 views may be generated by the CT system. The beam, after being attenuated by the patient, impinges upon the array of radiation detector elements. The detector array typically includes a collimator for collimating x-ray beams received at the detector, a scintillator disposed adjacent to the collimator for converting x-rays to light energy, and photodiodes for receiving the light energy from the adjacent scintillator and producing electrical signals therefrom. An intensity of the attenuated beam radiation received at the detector array is typically dependent upon the attenuation of the x-ray beam by the patient. Each detector element of a detector array produces a separate electrical signal indicative of the attenuated beam received by each detector element. The electrical signals are transmitted to a data processing system for analysis. The data processing system processes the electrical signals to facilitate generation of an image.

The detector arrays may be curved, such that the detector elements arranged on the detector arrays are aligned towards the x-ray source, to more accurately and efficiently detect the x-rays emitted by the x-ray source. The detector elements may be organized in clusters. For example, a detector array may include a plurality of detector modules; each detector module may include a plurality of detector element groupings called chiclets; and each chiclet may include a plurality of detector elements.

The quality of an image reconstructed from projection data collected from the detector elements may be dependent on an alignment of each detector element with the x-ray source. Some detector elements may not be precisely aligned during the assembly due to the limited capability of a mechanical alignment tool or may become misaligned over time or due to a use of the CT system. For example, a detector module of a detector array may be damaged, and the detector module may be replaced with a new detector module. The new detector module may not be accurately aligned due to a lack of a high precision alignment tool at a customer site. To begin with, detector modules may not be assembled accurately within the detector array; chiclets may be misaligned within a detector module; and/or detector elements may be misaligned within a chiclet.

Misalignments in a number of detector elements may increase a number of noise artifacts in the image and/or reduce the quality of the image. The image quality may be increased by correcting for the misalignments. To correct for the misalignments, the CT system may be periodically calibrated, where positions of the detector modules, chiclets, or detector elements may be mechanically adjusted. However, measuring and correcting the misalignments is currently performed using alignment techniques that may not be feasible for newer versions of CT systems having smaller detector elements and pixel sizes.

To address the problem of calibrating CT systems including the smaller detector elements and correcting for misalignments of the detector elements, a method is proposed herein for measuring the position of detector elements directly that does not rely on the mechanical alignment techniques, but rather generates the detector positions from projection data collected using a wire phantom. Calibration vectors may be generated from the measured detector positions, which may be applied to projection data acquired during a subsequent scan during image reconstruction, to correct for misaligned detector positions. In some embodiments, rather than correcting for misaligned detector positions, the measured detector positions may be directly applied during image reconstruction instead of target design detector positions.

Figure 2:
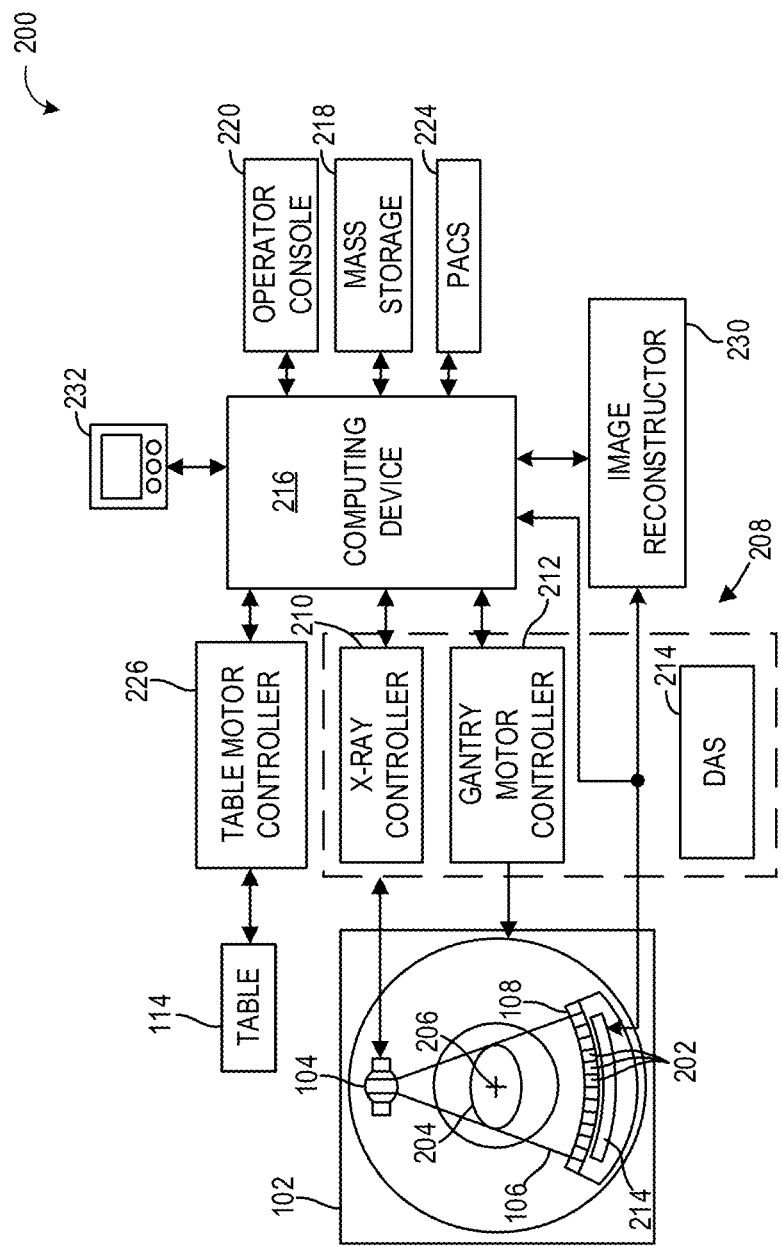
FIG. 2 shows a block schematic diagram of an exemplary CT imaging system, in accordance with one or more embodiments of the present disclosure.
Figure 3A:
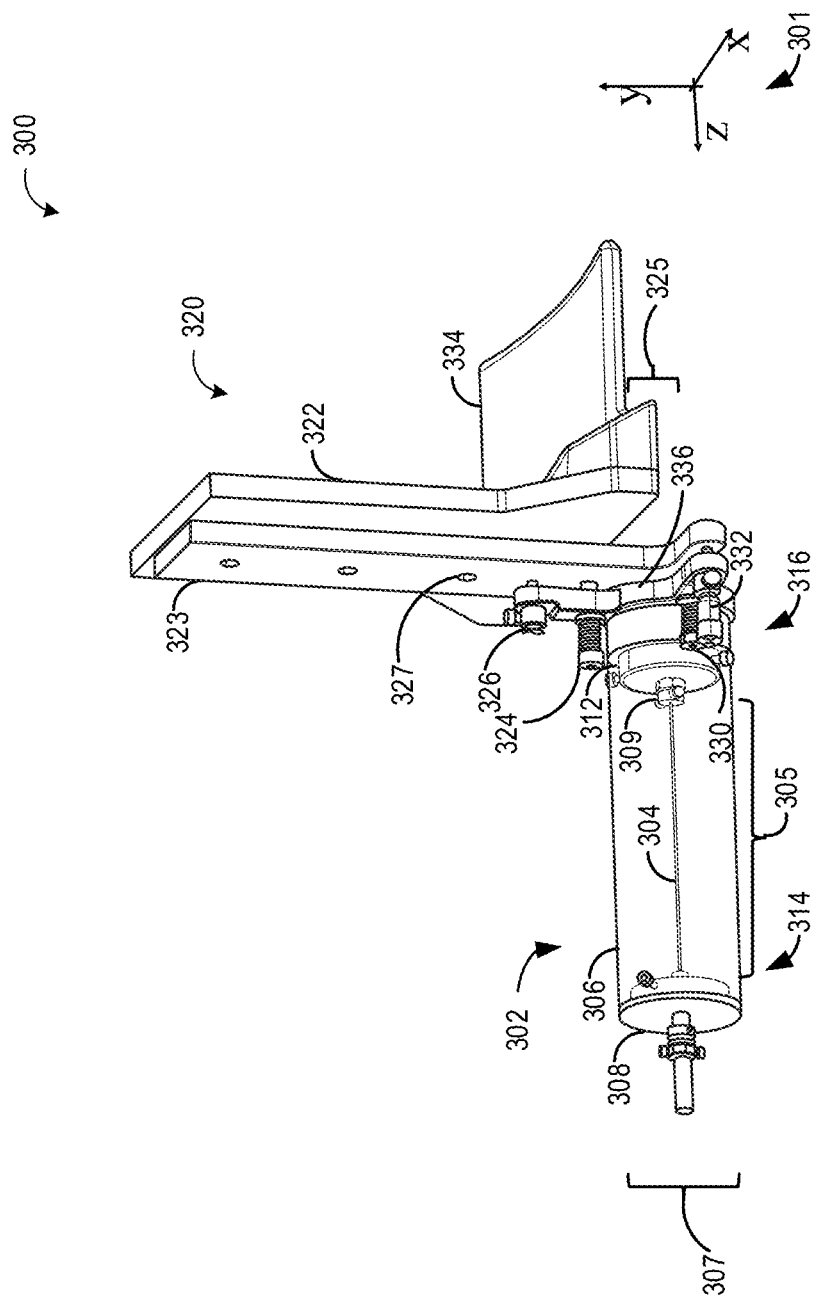
FIG. 3A is a wire phantom for calibrating a CT imaging system, in accordance with one or more embodiments of the present disclosure.
Figure 3B:
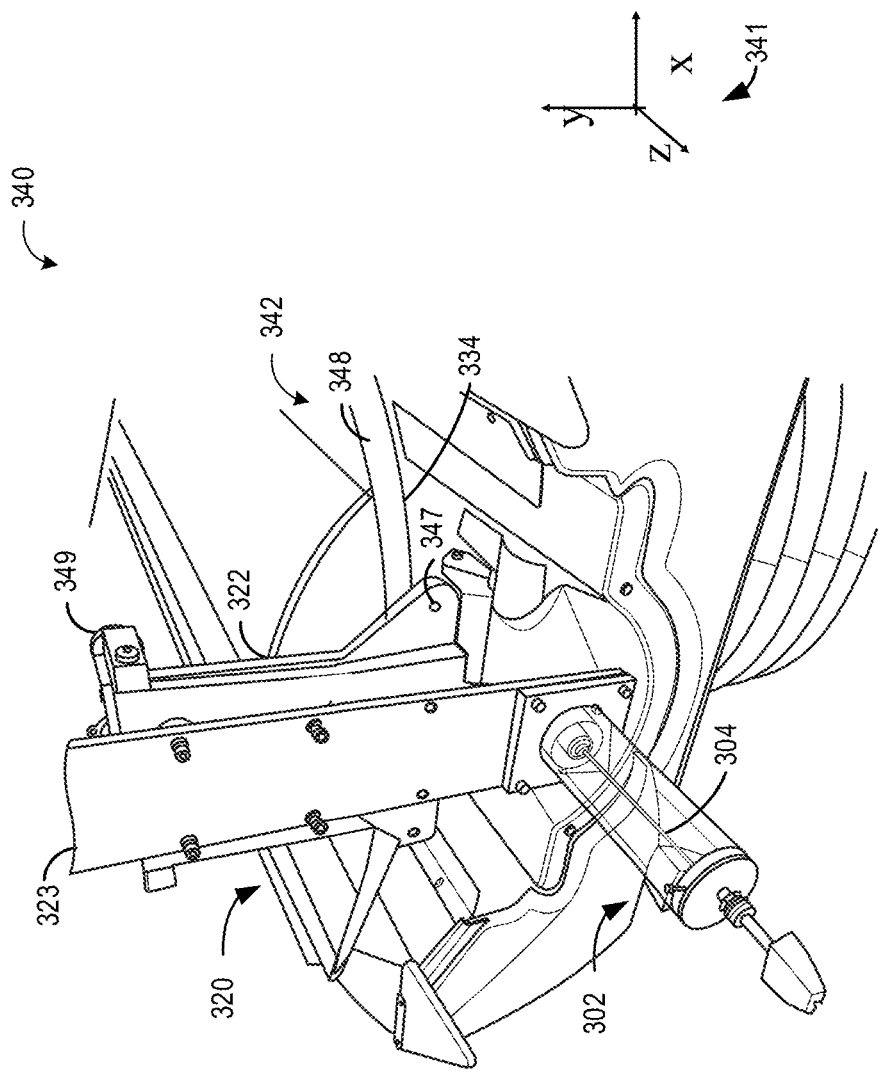
FIG. 3B shows an alignment of the wire phantom of FIG. 3A with respect to a table of a CT system, in accordance with one or more embodiments of the present disclosure.
Figure 3C:
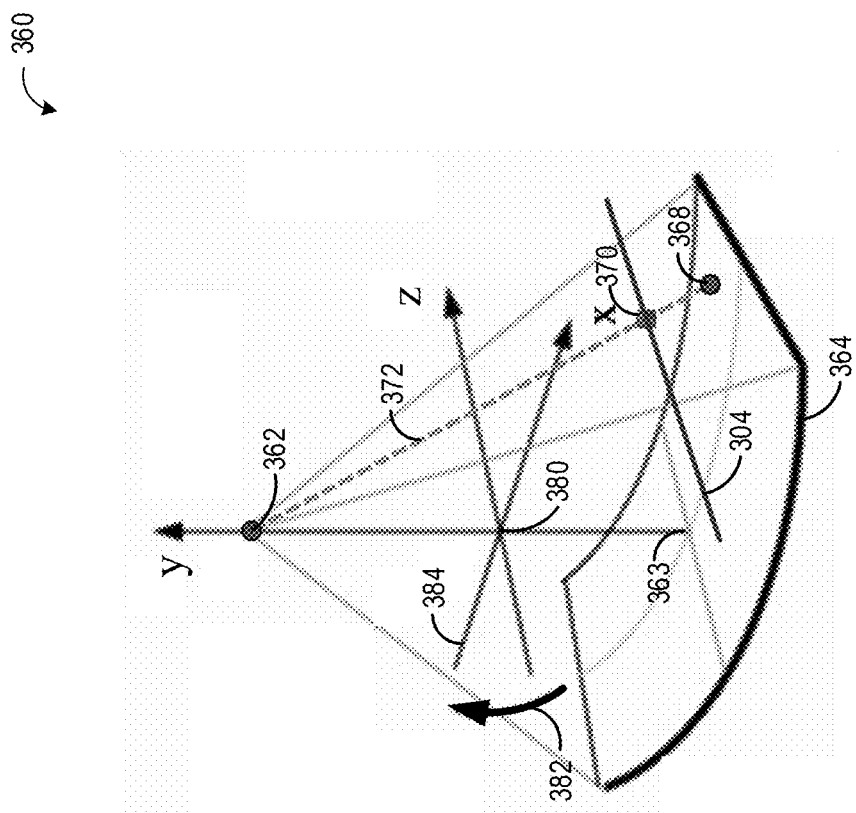
FIG. 3C shows an alignment of the wire phantom of FIG. 3A with respect to a detector array of a CT system, in accordance with one or more embodiments of the present disclosure.
Figure 4:
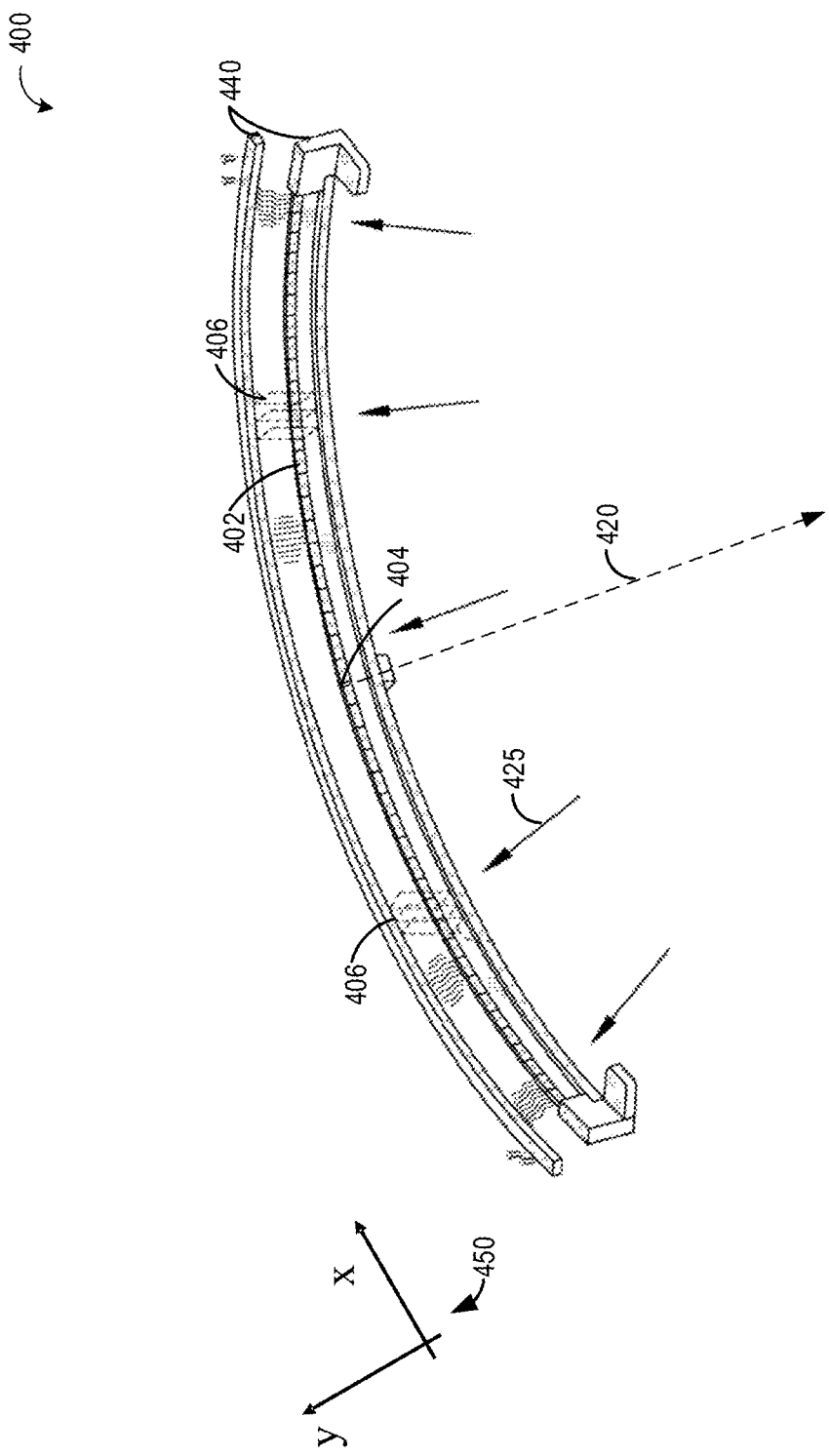
FIG. 4 is a schematic diagram of an exemplary detector array of a CT system, in accordance with one or more embodiments of the present disclosure.
Figure 5A:
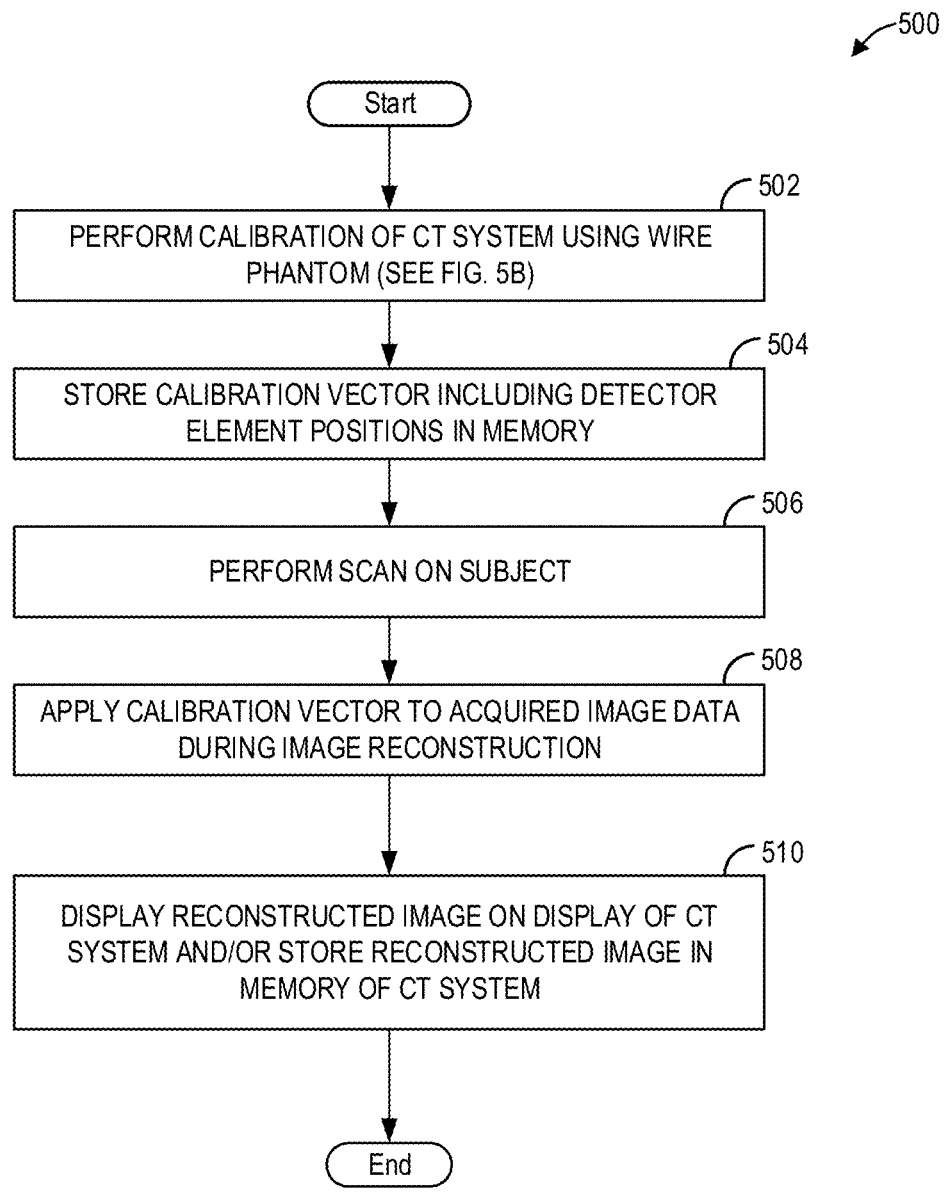
FIG. 5A is a flowchart illustrating an exemplary method for increasing an accuracy of a CT image using calibration data, in accordance with one or more embodiments of the present disclosure.
Figure 5B:
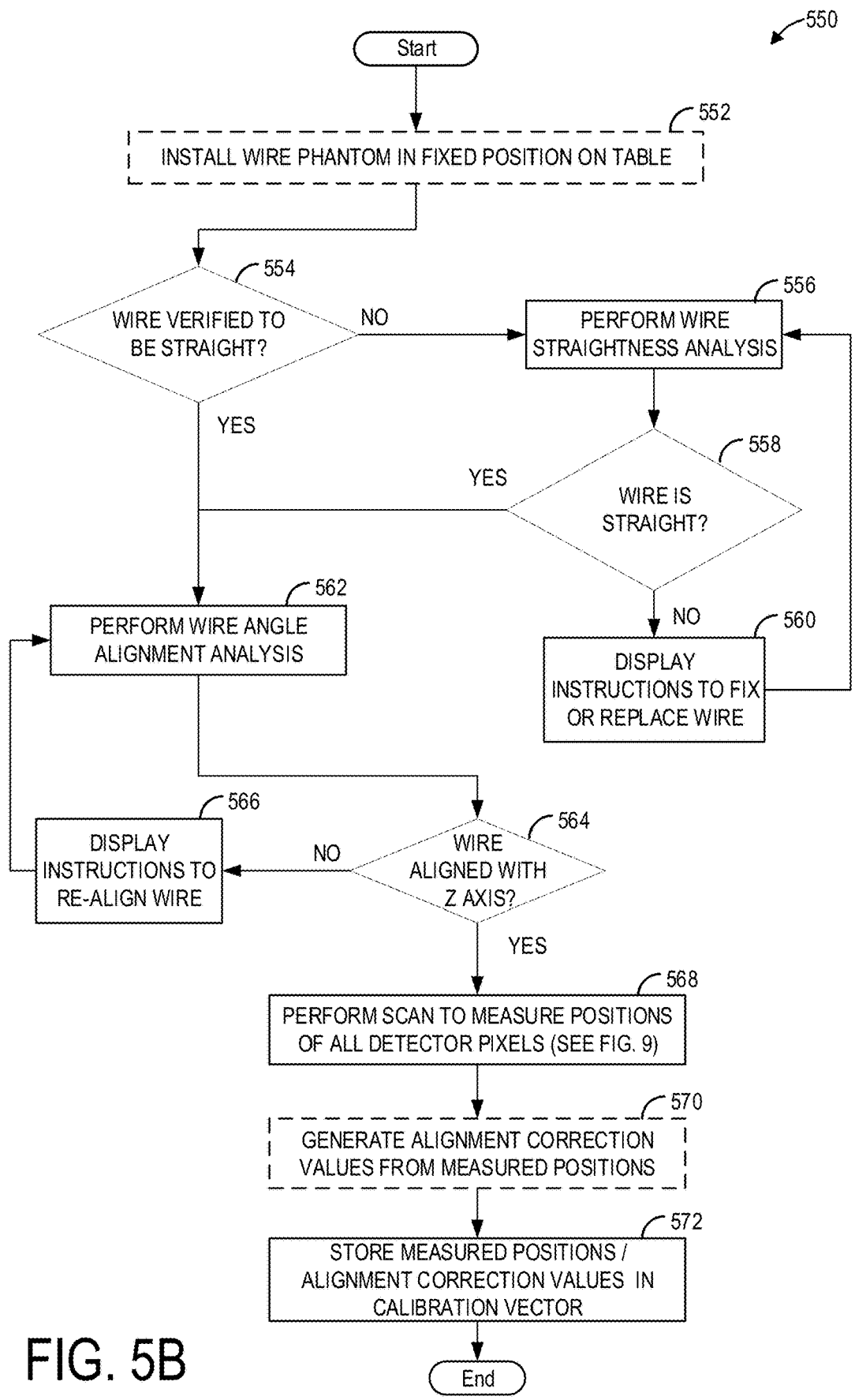
FIG. 5B is a flowchart illustrating an exemplary method for calibrating a CT system using a wire phantom, in accordance with one or more embodiments of the present disclosure.
Figure 6:
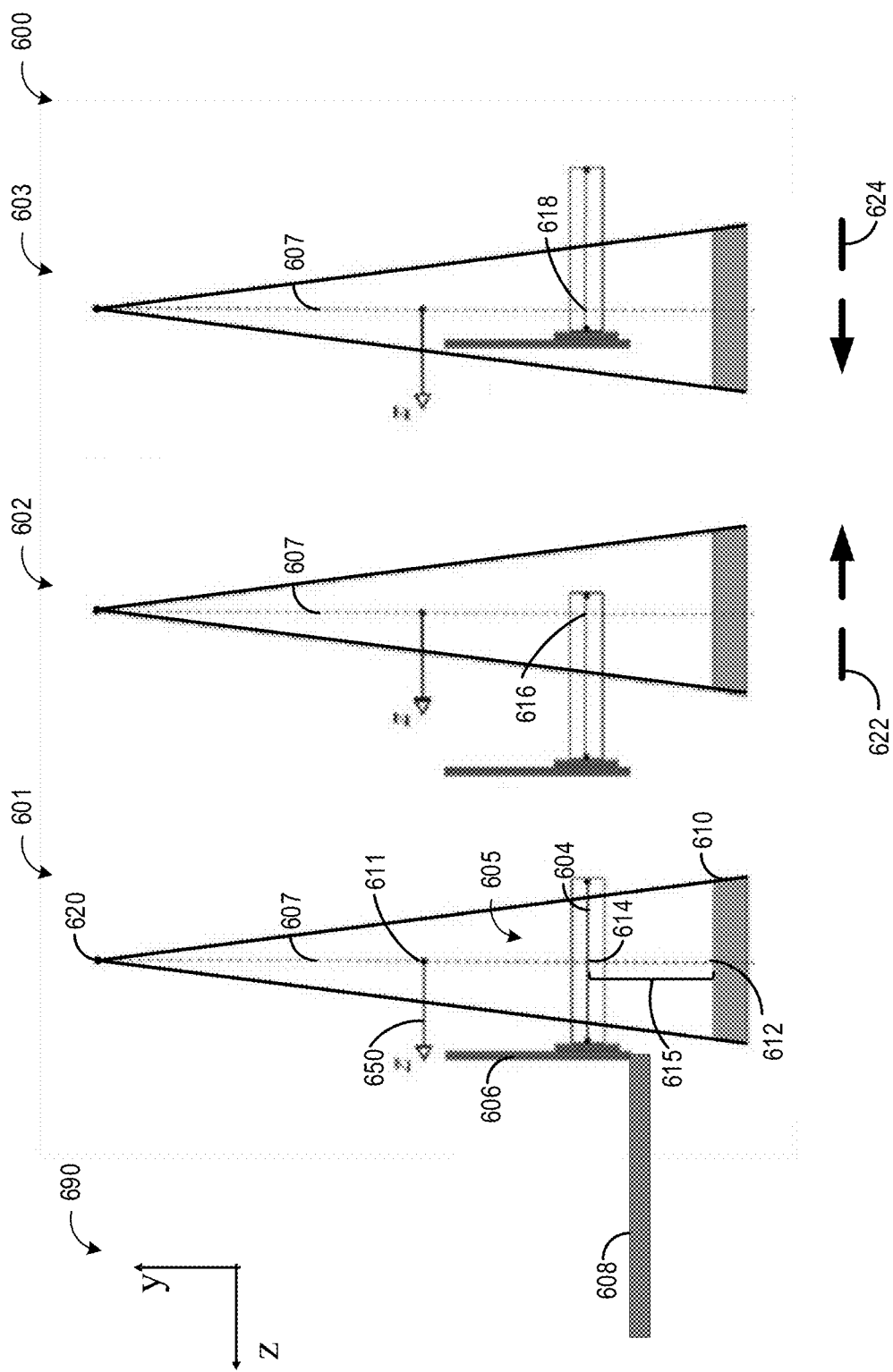
FIG. 6 is a schematic diagram showing an exemplary alignment of a wire phantom with respect to an x-ray source and an x-ray detector array, in accordance with one or more embodiments of the present disclosure.
Figure 7:
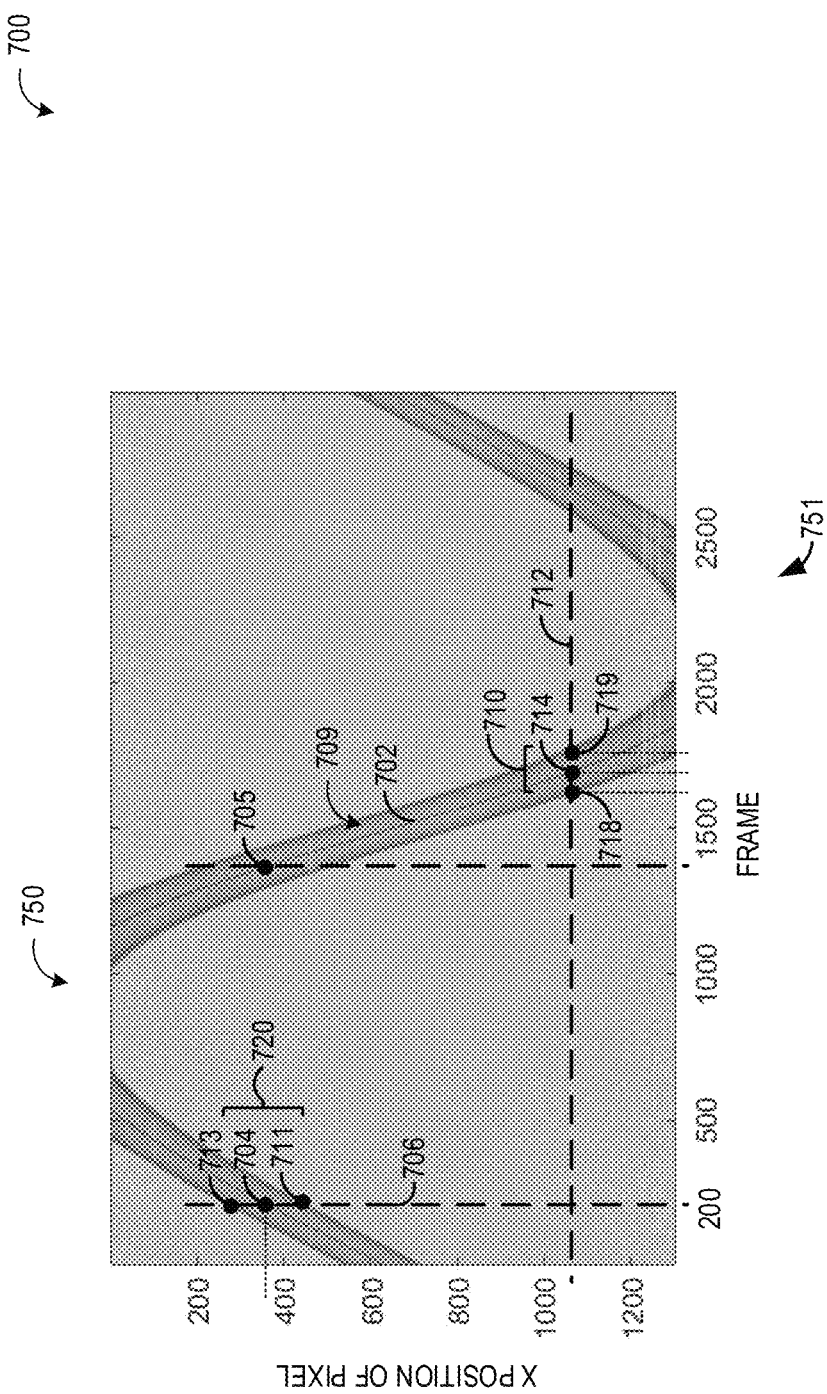
FIG. 7 is a graph of a sinogram generated using a wire phantom, in accordance with one or more embodiments of the present disclosure.
Figure 8:
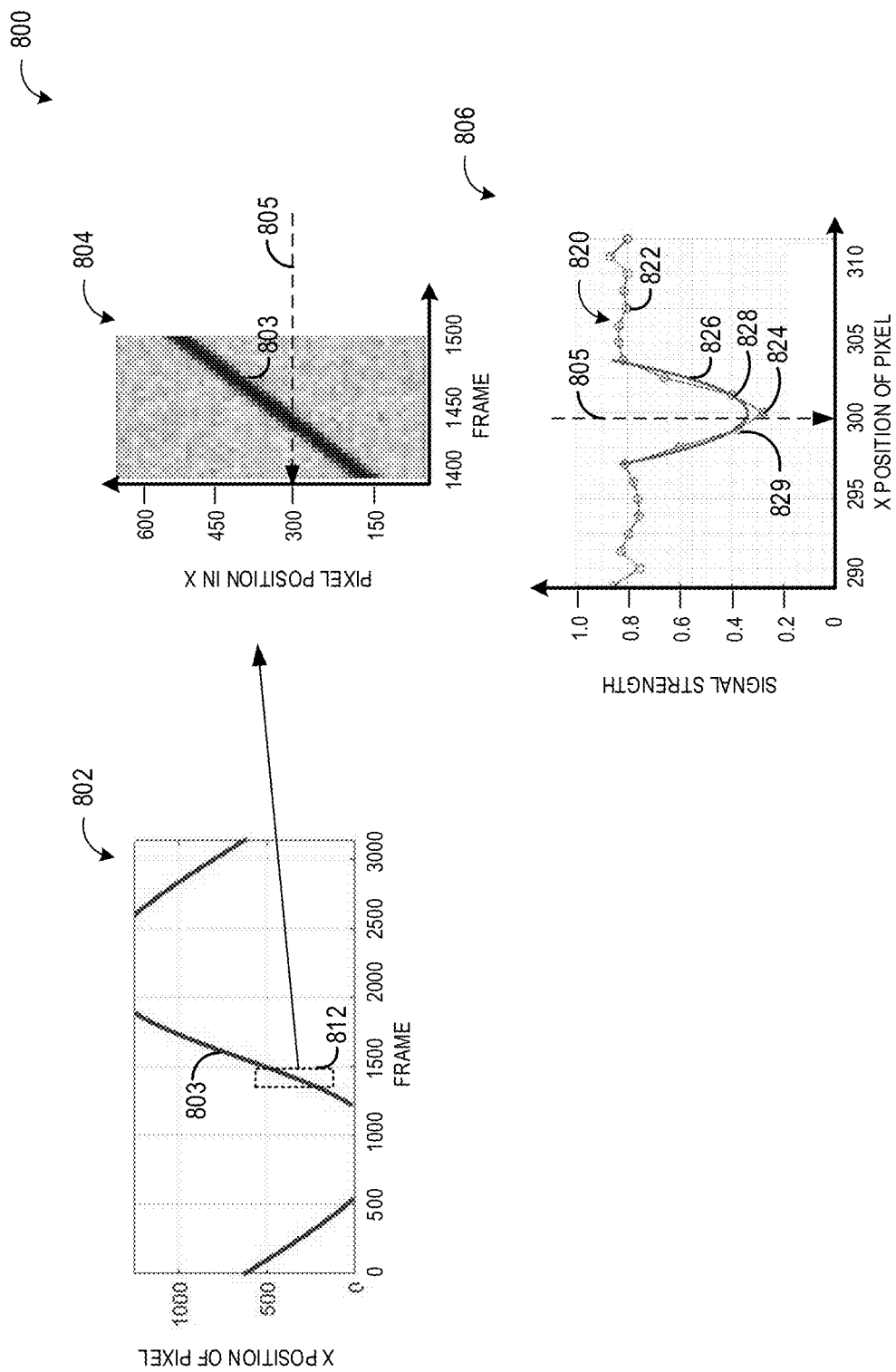
FIG. 8 shows how a parabolic function may be fitted to an output of a detector array to determine a position of a detector element, in accordance with one or more embodiments of the present disclosure.

An example of a CT system is provided in FIGS. 1 and 2. FIG. 3A shows an exemplary wire phantom that may be used to calibrate the CT system. The wire phantom may be mounted on a table of the CT system, as depicted in FIG. 3B. FIG. 3C shows a position of a wire of the wire phantom with respect to an x-ray source and a detector array of the CT system during a calibration process described herein. The detector array may include a plurality of detector elements organized in modules, as shown in FIG. 4. A method for calibrating the CT system to correct for misalignments of the detector elements is shown in FIG. 5B, and a method for applying measured detector locations generated during the calibration process during image reconstruction to increase a quality of a resulting image is shown in FIG. 5A. FIG. 6 shows a positioning of the wire phantom within an imaging plane of the CT system during the calibration. During the calibration, projection data may be collected at the detector elements as a gantry holding the detector array and an x-ray source rotates around the wire phantom. Due to the rotation, the projection data collected during calibration may be represented graphically as a sinogram, as shown in FIG. 7, which may indicate which detector elements detect an attenuation of x-rays by the wire at a given view angle or frame. The attenuation may be greatest at a detector element indicated by a parabolic function fitted to detector output data, as shown in FIG. 8. A position of the detector element with respect to the wire may be measured in accordance with the projection geometry shown in FIG. 9.

FIGS. 3A, 3B, 4, and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below/underneath one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/ below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 illustrates an exemplary CT system 100 configured for CT imaging. Particularly, CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts a single x-ray source 104, in certain embodiments, multiple x-ray sources and detectors may be employed to project a plurality of x-ray radiation beams for acquiring projection data at different energy levels corresponding to the patient. In some embodiments, the x-ray source 104 may enable rapid peak kilovoltage (kVp) switching. In the embodiments described herein, the x-ray detector employed is a photon-counting detector which is capable of differentiating x-ray photons of different energies.

In certain embodiments, the CT system 100 further includes an image processing unit 110 configured to reconstruct images of a target volume of the subject 112 using an iterative or analytic image reconstruction method. For example, the image processing unit 110 may use an analytic image reconstruction approach such as filtered back projection (FBP) to reconstruct images of a target volume of the patient. As another example, the image processing unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processing unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of an x-ray radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the x-ray beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. In some embodiments, the detector array 108 may be fabricated in a multislice configuration including the plurality of rows of cells or detector elements 202, where one or more additional rows of the detector elements 202 are arranged in a parallel configuration for acquiring the projection data. An exemplary detector array configuration is described in greater detail below in reference to FIG. 4.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon-counting detectors which register the interactions of individual photons into one or more energy bins.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. It is noted that the computing device 216 may be the same or similar to image processing unit 110, in at least one example. In one example, the computing device 216 stores the data in a storage device or mass storage 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Detector array 108 may include a plurality of detector modules. Each detector module may include a plurality of chiclets, where a chiclet is a set of individual sensors or detector elements.

Referring briefly to FIG. 4, an exemplary detector array 400 is shown. It should be understood that detector array 400 may be configured in different sizes and/or shapes, such as square, rectangular, circular, or another shape. An actual field of view (FOV) of detector array 400 may be directly proportional to the size and shape of detector array 400. In the depicted embodiment, detector array 400 has a curvature, where detector elements of detector array 400 are aligned towards an x-ray source located at a fixed distance above a center point 404 of detector array 400 along a y axis as indicated by dashed line 420 and reference axes 450.

Detector array 400 includes rails 440 having collimating blades or plates 406 placed therebetween. Plates 406 are positioned to collimate x-rays 425 before such beams impinge upon a plurality of detector modules 402 of detector array 400, which may be arranged between the plates 406. Each detector module 402 may include a plurality of chiclets, and each chiclet may include a plurality of detector elements or pixels. As an example, detector array 400 may include 25 detector modules 402; each detector module 402 may include 16 chiclets; and each chiclet may include 12 detector elements. Thus, each detector module 402 includes 192 detector elements, and a total of 4,800 detector elements are included in detector array 400. In one example, the width of the chiclet is 8.74 mm, and each detector element has 100 pixels, each pixel with a width of 365 um in X and a pitch of 765 microns in Z. The small pixel size of 365 um requires a precise mechanical alignment that may be difficult to achieve even though a positioning of the detector element within each chiclet may be controlled by robot placement.

Returning to FIG. 2, because the reconstructed images are generated from electrical signals produced at each detector element 202, an accuracy and/or image quality of the reconstructed images may depend on detector elements 202 being aligned within the detector arrays. Each detector element 202 has a position within a respective detector array. Not all the detector elements 202 may be correctly positioned. If an actual position of a detector element 202 varies from a design target position (e.g., if the detector element is misaligned), the accuracy of the reconstructed images may decrease.

The detector elements 202 may be very small and difficult to align. For example, a variation in alignment of less than 10% (e.g., less than 36.5 microns) may be desired to achieve a threshold image quality. If a portion of detector elements 202 are misaligned with respect to either or both of the x axis and the z axis by more than 10%, a quality of the reconstructed images may decrease.

In some examples, the portion of detector elements 202 may be misaligned due to a manufacturing process, or as a result of CT imaging system 200 being transported from a factory to a hospital. The portion of detector elements 202 may also become misaligned when a detector module of a detector array 108 becomes damaged and/or is replaced with a new detector module. The misalignment may occur between detector modules (e.g., module-to-module alignment), or between portions of a detector module (e.g., chiclet-to-chiclet alignment), or between sensors of a chiclet.

To ensure that a threshold image quality is achieved, one or more detector arrays 108 of CT imaging system 200 may be periodically calibrated. For example, the one or more detector arrays 108 may be calibrated when CT imaging system 200 is first installed in a healthcare facility, or after a damaged module is replaced, or after a predetermined amount of time, or at a different time. During calibration, a position of each detector element 202 may be measured with respect to a reference position provided by a wire phantom. Slight variations in the positions of the detector elements with respect to the reference position may be detected, collected, and used to generate a calibration vector for each detector array 108. The calibration vector may include the measured positions of the detector elements, or correction values for the measured positions of each detector element 202 of the detector array. The calibration vector may be used to perform a mechanical alignment of various detector elements of a detector array. Additionally or alternatively, during image reconstruction, the calibration vector may be applied to projection data acquired from the detector elements 202 to correct for the variations in the positions of the detector elements 202. By correcting for the variations, the image quality may be increased.

FIG. 3A shows an exemplary wire phantom assembly 300 used to calibrate the one or more detector arrays 108. Wire phantom assembly 300 includes a wire phantom 302, and a table mount 320, which may be used to mount wire phantom 302 to a table (e.g., table 114) of a CT imaging system such as CT imaging system 200 of FIG. 2.

Table mount 320 includes a mounting surface 334 that may be coupled to a surface of the table, and a phantom holder 323 to which wire phantom 302 may be coupled at a desirable position. Phantom holder 323 may allow wire phantom 302 to be adjustably positioned at a distance 325 below a lower surface of the table. For example, distance 325 may be adjusted by bolting phantom holder 323 to table mount 320 at different locations 327 (e.g., holes in phantom holder 323). Table mount 320 may include one or more rubber shims 322 coupled to phantom holder 323, which may be aligned in face-sharing contact with an edge of the table. Rubber shims 322 may provide a tighter and firmer coupling of table mount 320 with the table. A base plate 336 of wire phantom 302 may be coupled to phantom holder 323 via one or more bolts, such as a first bolt 324 and a second bolt 330.

Referring briefly to FIG. 3B, a table mounting diagram 340 shows an alignment of wire phantom 302 and table mount 320 with a table 342 of the CT imaging system. A mounting surface 334 may be aligned with a lower surface 348 of table 342. For example, mounting surface 334 may be clamped to lower surface 348. An alignment of phantom holder 323 with respect to lower surface 348 of table 342 along an x axis of the CT imaging system (e.g., in accordance with reference axes 341) may be adjusted via a first tilt screw 347. An alignment of phantom holder 323 with respect to lower surface 348 of table 342 along a y axis of the CT imaging system may be adjusted via a second tilt screw 349.

Returning to FIG. 3A, wire phantom 302 includes a wire 304 positioned along a central axis of a tube 306, where the central axis is aligned with a z axis of the CT imaging system. Tube 306 may protect wire 304 and provide a structure to maintain an straightness of wire 304 and protect the wire 302. Wire phantom 302 includes a first end cap 308 at a first side 314 (e.g., a gantry side) of wire phantom 302, and a second end cap 312 at a second side 316 (e.g., a table side) of wire phantom 302. Wire 304 extends from a first internal surface of first end cap 308 to a second internal surface of a second end cap 312. First end cap 308, second end cap 312, and tube 306 have a diameter 307. For example, diameter 307 may be 20 cm, or a different number.

Wire 304 may have a length 305, where length 305 is sufficiently long to cover a full detector array. For example, length 305 may be 150 mm or longer. Wire 304 may include or be manufactured of a high attenuation material, such as steel or tungsten, which may attenuate x-rays and leave a distinctive signal in a readout of the CT imaging system during the scan. During calibration, a position of each detector element may be measured with respect to a position of wire 304. A scan may be performed on wire phantom 302. As a detector array rotates around the table via a gantry (e.g., gantry 102), an attenuation of x-rays by wire 304 may be detected by each detector element at different view angles.

A thickness or diameter of wire 304 may depend on a transaxial dimension of a detector element (e.g., a pixel). To measure each pixel location in a repeatable and reliable manner, a suitable diameter may be 2-4 times larger than the transaxial pixel dimension. In various embodiments, the suitable diameter is at least three times the transaxial dimension. In one embodiment, the transaxial dimension is 356 microns, and the diameter of wire 304 is 1 mm (roughly three pixels wide). Thus, if the diameter of wire 304 is roughly equal to three pixel-widths, an attenuation of the x-rays by wire 304 during calibration may be detected by three or more pixels at a given view angle.

Wire 304 may be a multithread and/or braided wire, which may be easier to achieve a threshold straightness than a solid wire. For example, the threshold straightness may be a permitted variation of 30 microns from straight. In various embodiments, the threshold straightness may be maintained by placing wire 304 under a tension of a spring 309. Additionally, wire 304 may be molded with a plastic resin, which may further ensure that the threshold straightness is achieved.

An accuracy of the positions of the detector elements measured during calibration may depend on a precise angle alignment of wire 304 with respect to the table and the gantry. In one example, the precise angle alignment may be within a threshold of 3 milliradians (mrad) of parallel to a central axis of the gantry. The precise angle alignment may be controlled and/or adjusted via one or more tilt screws positioned on phantom holder 323. Specifically, an alignment of wire 304 with respect to table mount 320 may be adjusted via a first wire phantom tilt screw 326 and/or a second wire phantom tilt screw 332. First wire phantom tilt screw 326 may adjust the vertical angle alignment of wire phantom 302 (e.g., in the y dimension indicated by references axes 301), and second wire phantom tilt screw 332 may adjust the horizontal angle alignment of wire phantom 302 (e.g., in the x dimension). Wire 304 may be aligned or re-aligned to parallel with the central axis of the gantry before or after each calibration and/or data analysis. The residual uncertainty coming from 3 milliradians or less alignment accuracy may be corrected at a wire-itself adjustment and fitting step as a final step of the calibration.

FIG. 3C shows a detector array diagram 360 indicating an exemplary positioning of wire 304 with respect to the detector array during calibration using wire phantom 302. Detector array diagram 360 includes an x-ray source 362 and a detector array 364. X-ray source 362 and detector array 364 may be mounted at fixed positions on a gantry (e.g., gantry 102). X-ray source 362 and a center point 363 of detector array 364 may be aligned along a y axis of the CT imaging system, where detector array 364 and x-ray source 362 rotate around an isocenter 380 of the gantry. The gantry may rotate in a direction indicated by arrow 382.

Detector array 364 has a shape of an arc in a first dimension along an x axis of the CT imaging system, and may be flat in a second dimension along a z axis of the CT system. During a calibration scan, a table of the CT system (not shown in FIG. 3C) may be positioned along the z axis, where wire 304 may be coupled to an end of the table such that wire 304 extends between detector array 364 and x-ray source 362. Thus, a position of wire 304 relative to detector array 364 and x-ray source 362 changes as the gantry rotates.

In the position depicted in detector array diagram 360, an x-ray 372 directed at a detector element 368 may be attenuated by wire 304 when x-ray 372 strikes wire 304 at a point 370 on wire 304, whereby detector element 368 may detect less of x-ray 372. However, other x-rays emitted by x-ray source 362 at a same x position (e.g., along the x-dimension depicted by arrow 384) may be detected by other detector elements positioned at the same x position on detector array 364. Thus, the attenuation of x-ray 372 by wire 304 may be used to establish a linear relationship between detector element 368, point 370 on wire 304, and x-ray source 362. Once the linear relationship has been established, projection geometry may be leveraged to measure a position of detector element 368 on detector array 364 and an angle of alignment of detector element 368 in the x and z axes with respect to wire 304. How the position of detector element 368 is calculated based on the attenuation of x-ray 372 is explained in greater detail below in reference to FIGS. 7, 8, and 9.

Referring now to FIG. 7, a wire position graph 700 shows an exemplary line 702 indicating a position of a wire of a wire phantom, such as wire 304 of wire phantom 302 of FIG. 3A, as detected by a plurality of detector elements of a detector array, over a plurality of view angles, during one full rotation of a gantry during a scan performed by a CT imaging system. Frames corresponding to different view angles are shown on an x axis of wire position graph 700, and a pixel (e.g., detector element) position in an x dimension is shown on a y axis of wire position graph 700.

Line 702 has a shape of a sinogram, due to the rotation of the gantry around the wire, as described above. During calibration, the wire phantom may be coupled to a table at a fixed position with respect to the gantry. The fixed position may be outside a field of view (FOV) of the detector array, to ensure that all detector elements of the detector array are calibrated. For example, the fixed position may be 50 cm outside the FOV. In other words, if the fixed position were inside the FOV, some detector elements of the detector array between the fixed position and an edge of the FOV would not detect the wire, and would not be calibrated. As a result of the fixed position being outside the FOV, a top portion 750 of line 702 and a bottom portion 751 of line 702 may be excluded from wire position graph 700.

For example, a first point 704 on line 702 may indicate that at a view angle corresponding to a $200^{th}$ frame, a first attenuation of x-rays by the wire (referred to herein as wire attenuation) is detected to a greatest degree by a first detector element at an x position of 350 of a detector array including the detector element. The first wire attenuation may indicate the x position (e.g., 350) of the detector element within the detector array.

As a second example, a second point 705 on line 702 may indicate that at a view angle corresponding to a $1350^{th}$ frame, a second wire attenuation is detected to a greatest degree by the first detector element at the x position of 350 of the detector array. The second wire attenuation may confirm the x position (e.g., 350) of the detector element within the detector array. Each detector element of the detector array may detect the wire at two different frames of the full rotation.

Because a diameter of the wire is greater than a transaxial diameter of a detector element of the detector array, the attenuation of x-rays by the wire may be detected by more than one neighboring detector element. For example, if the diameter of the wire is one pixel, and the transaxial diameter of the detector element is 356 microns, 3-5 neighboring detector elements may record the attenuation. The attenuation may be strongest at a center pixel of the 3-5 neighboring detector elements, where line 702 corresponds to the center pixels recording the wire attenuation as the gantry rotates. The wire attenuation may be less at the neighboring detector elements, generating a wire shading 709 around line 702.

In wire position graph 700, wire shading 709 around line 702 may have a horizontal extent 710, where horizontal extent 710 is based on a number of view angles over which the attenuation is recorded by a single detector element. Wire shading 709 may also have a vertical extent 720, where vertical extent 720 is based on a number of pixels recording the attenuation at a given view angle.

For example, first dashed line 706 indicates that at the $200^{th}$ frame, x-rays are attenuated by the wire most at the detector element at the x position of 350 (on the y axis) corresponding to first point 704. However, x-rays are also attenuated to a lesser degree by neighboring detector elements in the x direction (on the y axis), such as detector elements corresponding to a first neighboring point 711 and a second neighboring point 713.

Similarly, a second dashed line 712 indicates that a single detector element may detect the attenuation of the wire over a plurality of neighboring frames/view angles. As the position of the detector element with respect to the wire changes due to the rotation of the gantry, the detector element may detect an attenuation that increases to a maximum attenuation and then decreases to zero. For example, second dashed line 712 indicates that a detector element at an x position of 1050 (on the y axis) may record a first, lower attenuation at a $1650^{th}$ frame corresponding to a point 718; a second, maximum attenuation at a $1700^{th}$ frame corresponding to a point 714 (e.g., on line 702); and a third, lower attenuation at a $1750^{th}$ frame corresponding to a point 719.

FIG. 8 shows a fitting diagram 800 that illustrates how an exact x position of a detector element within the detector array may be precisely determined from line 702, by fitting a function to measurements made at the detector element. For example, the function may be a Gaussian function, or a parabolic function, or a different kind of function. Fitting diagram 800 includes a wire position graph 802 similar to wire position graph 700, where an exemplary line 803 indicates a position of a wire of a wire phantom, in the shape of a sinogram, as generated by wire attenuation measurements recorded at a plurality of detector elements/pixels. An x position of pixels within the detector array is indicated along a y axis of graph 802, and a plurality of frames over which the gantry is rotated is indicated on the x axis, as in FIG. 7. A portion 812 of line 803 is shown in an expanded view 804, where portion 812 indicates wire shading around line 803.

A graph 806 shows a plot 820 of measurements 822 collected at a plurality of pixels corresponding to portion 812, centered around a pixel at an x position of 300 on the detector array, indicated by a dashed line 805. A strength of a signal generated at the pixels is shown on a y axis of graph 806, and the x position of the pixels is indicated on the x axis of graph 806, such that each measurement shown in graph 806 indicates a normalized signal strength between 0.0 and 1.0 recorded for a corresponding pixel. A lowest signal strength 824 is recorded for the pixel at the x position of 300 (e.g., 0.3), where x-rays are most attenuated by the wire. Low signal strength measurements at 828 and 829 (e.g., 0.4) indicate wire shading, where x-rays may be partially attenuated by the wire. Less shading is indicated at other neighboring pixels, but the shading does not exceed two pixels on either side of the pixel at the x position of 300.

To precisely determine a pixel location where the x-rays are most attenuated by the wire, a parabolic function 826 may be fitted to the measurements 822. Because a thickness (e.g., diameter) of the wire may be greater than a transaxial dimension of the detector elements (e.g., several times greater), more than one detector element may record high levels of attenuation by the wire. Parabolic function 826 may be used to select a single detector element (e.g., the pixel location) at which the wire attenuation is the greatest. By using a wire with a thickness greater than the transaxial dimension of the detector elements, an accuracy of the pixel location may be increased with respect to other wire phantoms that include a thinner wire. For example, an alternative wire phantom with a thinner wire may generate inconsistent and/or missing signals as an x-ray beam sweeps across a detector array. Alternatively, using a wire that is too thick may obscure too many detector elements, reducing the accuracy of the pixel location. In various embodiments, the wire thickness may be selected based on dimensions or properties of the CT system being calibrated. For example, in one embodiment, the selected thickness may be a function of a first distance between adjacent detector elements (e.g., detector pitch), a size of a focal spot of the CT system, and a second distance between the focal spot and the detector elements. In other embodiments, other or different variables may be considered.

An attenuated signal weighted average may not provide a needed accuracy of the centroid of a wire position due to measurement variability caused by limited x-ray count statistics. Exemplary graph 806 shows a parabolic function fit to reduce a statistical variability or measurement to measurement variation. Exemplary graph 806 shows a fitting in a pixel direction to calculate a pixel centroid, but the fitting can be done to a frame direction to get a frame, depending on the final fitting model.

Once the single detector element at which the wire attenuation is the greatest is selected, a position of the single detector element with respect to the wire (e.g., a known location of the wire) may be measured using projection geometry. Measurement of the position of the single detector is described in greater detail below in reference to FIGS. 5A, 5B, and 9.

FIG. 5A shows a flowchart illustrating an exemplary method 500 for using calibration data to increase a quality of images reconstructed using a CT system, such as CT imaging systems 100 and 200 described above. As described above, during calibration of the CT system, a calibration vector may be generated including measured positions (or correction values) for each detector element of each detector array of the CT imaging system (e.g., detector arrays 108 and 400). During a subsequent scan of a subject (e.g., a patient) using the CT system, the calibration vector may be applied during image reconstruction, to correct for misalignments of the detector elements. Specifically, a processing of the projection data during image reconstruction may rely on a precise position of each detector element. However, a design target position of the detector element, for example, provided by a detector design drawing based on physical dimensions and characteristics of the CT imaging system, may differ from an actual, measured position of the detector element. The measured positions may be used to reconstruct the image, rather than the design target positions. By correcting for the misalignments, an accuracy and image quality of the reconstructed images may be increased. Method 500 may be stored as instructions in a non-transitory memory and executed by one or more processors of a computing device of a CT imaging system, such as computing device 216 of imaging system 200 of FIG. 2.

Method 500 begins at 502, where method 500 includes performing a calibration of one or more detector arrays of the CT imaging system using a wire phantom. Performing the calibration of the one or more detector arrays using the wire phantom is described in greater detail in reference to FIG. 5B.

At 504, method 500 includes storing a calibration vector generated during calibration of the CT imaging system in a memory of the CT imaging system, such as in a memory of computing device 216 of FIG. 2. The calibration vector may be retrieved and applied during processing of projection data acquired via the CT imaging system, until a new calibration vector is generated during a subsequent calibration.

At 506, method 500 includes performing a scan on a subject. During the scan, projection data may be acquired by the CT imaging system. However, the projection data may include pixel-level inaccuracies, due to misalignment of detector elements (e.g., detector elements 202) positioned on detector arrays of the CT imaging system.

At 508, method 500 includes applying the calibration vector during processing of the acquired projection data during image reconstruction. The calibration vector may include measured positions of each detector element in a detector array. During the image reconstruction, a signal generated by each detector element is processed based on a design target position of the detector element within a detector array. If an actual (e.g., measured) position of the detector element within the detector array is different from the design target position, an image quality of a resulting image may be reduced. Therefore, the measured positions of the detector elements stored in the calibration vector may be used instead of the design target positions.

Alternatively, in some embodiments, the calibration vector may include alignment correction values to correct for misalignments of the detector elements, where each position of each detector element in the projection data may be adjusted by applying a corresponding position correction value of the calibration vector. It should be appreciated that the calibration vector referred to herein should not be confused with other, different calibration vectors that may additionally be applied, for example, to correct for variations in signals from (correctly aligned) detector elements.

At 510, method 500 includes displaying a reconstructed image on a display device of the CT imaging system (e.g., display device 232 of FIG. 2) and/or storing the reconstructed image in a memory of the CT imaging system, and method 500 ends.

FIG. 5B shows a method 550 illustrating an exemplary procedure for calibrating a detector array of the CT imaging system using the wire phantom. Various steps of method 550 may be stored as instructions in a non-transitory memory and executed by one or more processors of a computing device of a CT imaging system, such as computing device 216 of imaging system 200 of FIG. 2. Some steps of method 550 may not be performed by the computing device, and may be performed manually, as indicated below.

Method 550 begins at 552, where method 550 includes installing the wire phantom at a fixed position on a table of the CT imaging system (e.g., table 114). The wire phantom may be installed manually, for example, by an operator of the CT imaging system. The wire phantom may be installed as described in relation to FIG. 3B, where the wire phantom may be mounted on an end or edge of the table, such that a wire of the wire phantom (e.g., wire 304) extends into a space between the detector array and an x-ray source, as described above in relation to FIG. 3C. The fixed position of the wire may be outside a field of view of the detector array. As an example, the wire phantom may be mounted on the table such that the wire is positioned at 180 degrees and 27 cm below the gantry iso center using a gantry horizontal and vertical laser. A level may be used on the wire tube to make it as level as possible with a Z axis of the CT imaging system. A center of the wire may be indicated as a 0 mm reference position in Z.

In some examples, method 550 may include providing instructions to the operator to move the table to a specified height and/or to a specified position along a z-axis of the CT imaging system. For example, after the operator mounts the wire phantom on the end or edge of the table, the instructions may be provided via a display device of the CT imaging system (e.g., display device 232).

At 554, method 550 includes determining whether the wire is verified to be straight, e.g., within a threshold tolerance for straightness. In various embodiments, the wire may be verified to be straight based on a received input of the operator. If there are variations in the straightness, the wire may not be used for calibrating the detector array. In one example, the threshold tolerance is 30 microns, where if a portion of the wire deviates from straight by more than 30 microns, the wire may not be considered straight, and may not be used for calibrating the detector array. If the wire does not deviate from straight by more than 30 microns, the wire may be verified as straight, and may be used for calibrating the detector array. If the wire phantom is new, or has not been tested recently, the straightness of the wire may be verified prior to continuing with the calibration. For example, the straightness of the wire may be periodically verified, such as every six months, or after a predetermined number of scans (e.g., 600) have been performed.

If at 554 it is determined that the wire has not been verified to be straight, method 550 proceeds to 556. At 556, method 550 includes performing an analysis of the straightness of the wire. During the straightness analysis, rotational scans of the wire phantom may be performed with the wire phantom at different positions along the z axis. In other words, between each rotational scan, a position of the wire phantom along the z axis may be adjusted by small increments, such as 5 mm. During each rotational scan, data may be collected from a small number (e.g., 2-4) of center rows of the detector array, and data may not be collected from other rows of the detector array. The data collected from the small number of center rows may be used to determine whether the wire is within the threshold tolerance for straightness.

For example, with the wire phantom mounted on the table, a position of the table along the z axis may be adjusted such that a plane of rotation of the gantry in the x-y dimension (e.g., an imaging plane) intersects with the wire of the wire phantom at a first point on the wire. The plane of rotation may include a line along a y axis of the CT imaging system (e.g., dashed line 420 of FIG. 4) between an x-ray source of the CT imaging system and a center point of the detector array (e.g., x-ray source 362 and center point 363 of FIG. 3C), where the line is perpendicular to the z axis. A first rotational scan may be performed, and a first set of wire attenuation data from the 2-4 center rows of the detector array may be collected. The position of the table may then be adjusted by an increment to a second specific point, and a second rotational scan may be performed, and a second set of wire attenuation data from the 2-4 center rows of the detector array may be collected. The position of the table may then be adjusted by the increment to a third specific point, and a third rotational scan may be performed, and a third set of wire attenuation data may be collected, and so on, until data has been collected at a desired plurality of wire positions along the z axis.

For example, the table may be adjusted such that the imaging plane of the gantry intersects with the wire at a position of −55 mm with respect to the 0 position at the center of the wire, and the table may be adjusted by 5 mm increments along the z axis until reaching a position of 55 mm with respect to the 0 position, for a total of 23 scans. The 55 mm may be sufficient to cover a Z axis imaging field-of-view.

Referring briefly to FIG. 6, a wire phantom alignment diagram 600 shows a positioning of the wire phantom 605 at three different times during a collection of wire attenuation data, according to one embodiment. Wire phantom 605 is coupled to a table mount 606 (e.g., table mount 320), which is coupled to a table 608 (e.g., table 114).

At a first time 601, wire phantom 605 has been positioned such that an x-y rotational plane of the gantry indicated by a dotted line 607 intersects with a wire 604 of wire phantom 605 at a first point 614 of wire 604. The imaging plane of the gantry may be perpendicular to the z axis, shown by an arrow 650 and reference axes 690, and may include an x-ray source 620 on a first side of the gantry, a center point 612 of a detector array 610 positioned on a second, opposite side of the gantry, and an isocenter point 611 around which the gantry rotates. Wire phantom 605 is offset from isocenter point 611, such that as x-ray source 620 and detector array 610 rotate around isocenter point 611, a distance 615 between wire 604 and detector array 610 varies. First point 614 may be a center point of wire 604, and first point 614 may be landmarked as a 0 mm reference point of wire 604. At first time 601, wire 604 is positioned within a FOV of detector array 610.

At a second time 602, the position of wire phantom 605 along the z axis has been shifted in a first, positive direction indicated by a first arrow 622. Wire phantom 605 has been positioned such that the imaging plane indicated by dotted line 607 intersects with wire 604 of wire phantom 605 at a second point 616 of wire 604. Second point 616 may be at a 55 mm reference point of wire 604 (e.g., 55 mm from first point 614 at 0 mm, in the positive direction). At second time 602, wire 604 is positioned partially outside the FOV of detector array 610.

At a third time 603, the position of wire phantom 605 along the z axis has been shifted in a second, negative direction indicated by a second arrow 624. Wire phantom 605 has been positioned such that the imaging plane indicated by dotted line 607 intersects with wire 604 of wire phantom 605 at a third point 618 of wire 604. Third point 618 may be at a −55 mm reference point of wire 604 (e.g., 55 mm from first point 614, in the negative direction). At third time 603, wire 604 is positioned partially outside the FOV of detector array 610.

To determine a straightness of wire 604, data may be collected at a plurality of increments between first point 614 and third point 618, such as 5 mm increments, as described above. By collecting and comparing the data at the plurality of increments, a straightness of wire 604 may be precisely determined. For example, if a first set of wire attenuation data collected at second time 602 indicates a first position of a first portion of wire 604, and a second set of wire attenuation data collected at third time 603 indicates a second position of a second portion of wire 604, a deviation between the first position and the second position may indicate the first portion is not aligned with the second portion, whereby it may be inferred that wire 604 is not straight. If the deviation is less than a threshold deviation (e.g., 30 microns), wire 604 may be considered straight.

Returning to method 550, at 558, method 550 includes determining whether the wire is straight, in accordance with the procedure described above in reference to FIG. 6. If at 558 it is determined that the wire is not straight, method 550 proceeds to 560. At 560, method 550 includes displaying instructions on the display device to the operator for fixing or replacing the wire, and method 550 proceeds back to 556. If at 558 it is determined that the wire is straight, method 550 proceeds to 562.

At 562, method 550 includes performing an angle alignment analysis of the wire to determine an alignment of the wire with the z axis of the CT imaging system, along which the table is aligned. In one example, if the wire deviates from parallel with the z axis by less than a threshold deviation, the wire is considered to be aligned with the z axis. For example, the threshold deviation may be 3 mrad. In other words, if the wire deviates from parallel with the z axis by 3 mrads or more, the wire may be adjusted using adjustment tilt screws (e.g., the tilt screws 326 and 332 of FIG. 3A), and the alignment data collection and analysis may be repeated until less than 3 mrad is achieved, as described in the next paragraph.

To perform the wire alignment analysis, a second set of rotational scans may be performed. The second set of rotational scans may be performed in a similar manner as described above in relation to FIG. 6. However, a fewer number of scans may be performed since the wire is known to be straight. In one embodiment, two wire alignment scans may be performed. A first wire alignment scan of the wire phantom may be performed with the wire phantom positioned such that the imaging plane intersects with the wire at a first distance from the center, reference point of the wire (e.g., at 0 mm) in a first direction (e.g., arrow 622 of FIG. 6). A second wire alignment scan of the wire phantom may be performed with the wire phantom positioned such that the imaging plane intersects with the wire at a second distance from the center, reference point of the wire in a second, opposite direction (e.g., arrow 624). The second distance may be equal to the first distance. The first distance and the second distance may be separated by a threshold distance. For example, the threshold distance may be 80 mm.

For example, the first distance and the second distance may both be 40 mm. The table may be first adjusted to position the wire such that the imaging plane intersects with the wire at 40 mm with respect to the center, reference point on the wire, to perform a first rotational scan. The table may be subsequently adjusted to position the wire such that the imaging plane intersects with the wire at −40 mm with respect to the center, reference point on the wire, to perform a second rotational scan. At each of the first and the second rotational scans, wire attenuation data may be acquired at the 2-4 center rows of detector elements of the detector array. Performing the angle alignment analysis may be faster than performing the straightness analysis, as the wire is already verified to be straight.

By collecting and comparing the data from the first rotational scan and the second rotational scan, an angular alignment of wire 604 with the z axis may be precisely determined. For example, if a first set of wire attenuation data collected during the first rotational scan indicates a first position of wire 604, and a second set of wire attenuation data collected during the second rotational scan indicates a second position of wire 604, a deviation between the first position and the second position may indicate that the wire is out of alignment. If the deviation is less than the threshold deviation (e.g., 3 mrad), the wire may be considered aligned with the z axis.

At 564, method 550 includes determining whether the wire is aligned with the z axis, in accordance with the procedure described above. If the wire is determined not to be aligned with the z axis (e.g., with a deviation greater than the threshold deviation), method 550 proceeds to 566. At 566, method 550 includes displaying instructions on the display device for realigning the wire. In various embodiments, realigning the wire may be performed by the operator by adjusting one or more tilt screws of the wire phantom. For example, a vertical tilt screw positioned on a phantom holder of the wire phantom (e.g., tilt screw 326 of phantom holder 323) may adjust the wire relative to the y axis, and a horizontal tilt screw (e.g., tilt screw 332 of phantom holder 323) may adjust the wire relative to the x axis. After the wire has been realigned, method 550 proceeds back to 562, where the wire angle alignment analysis may be performed again. In some cases, the wire may be realigned and the wire angle alignment analysis may be performed a plurality of times to ensure that the wire is aligned with the z axis.

If at 564 the wire is determined to be aligned with the z axis, method 550 proceeds to 568. At 568, method 550 includes performing a calibration scan to measure a precise position of each individual detector element (detector elements 202) of the detector array with respect to the wire. Since the position of the wire is known and fixed, the precise position of each individual detector element may be measured by performing a full rotation and fitting a function to the sinogram generated by the projection data, as described above in reference to FIGS. 7 and 8, and using projection geometry based on physical characteristics of the CT system.

Figure 9:
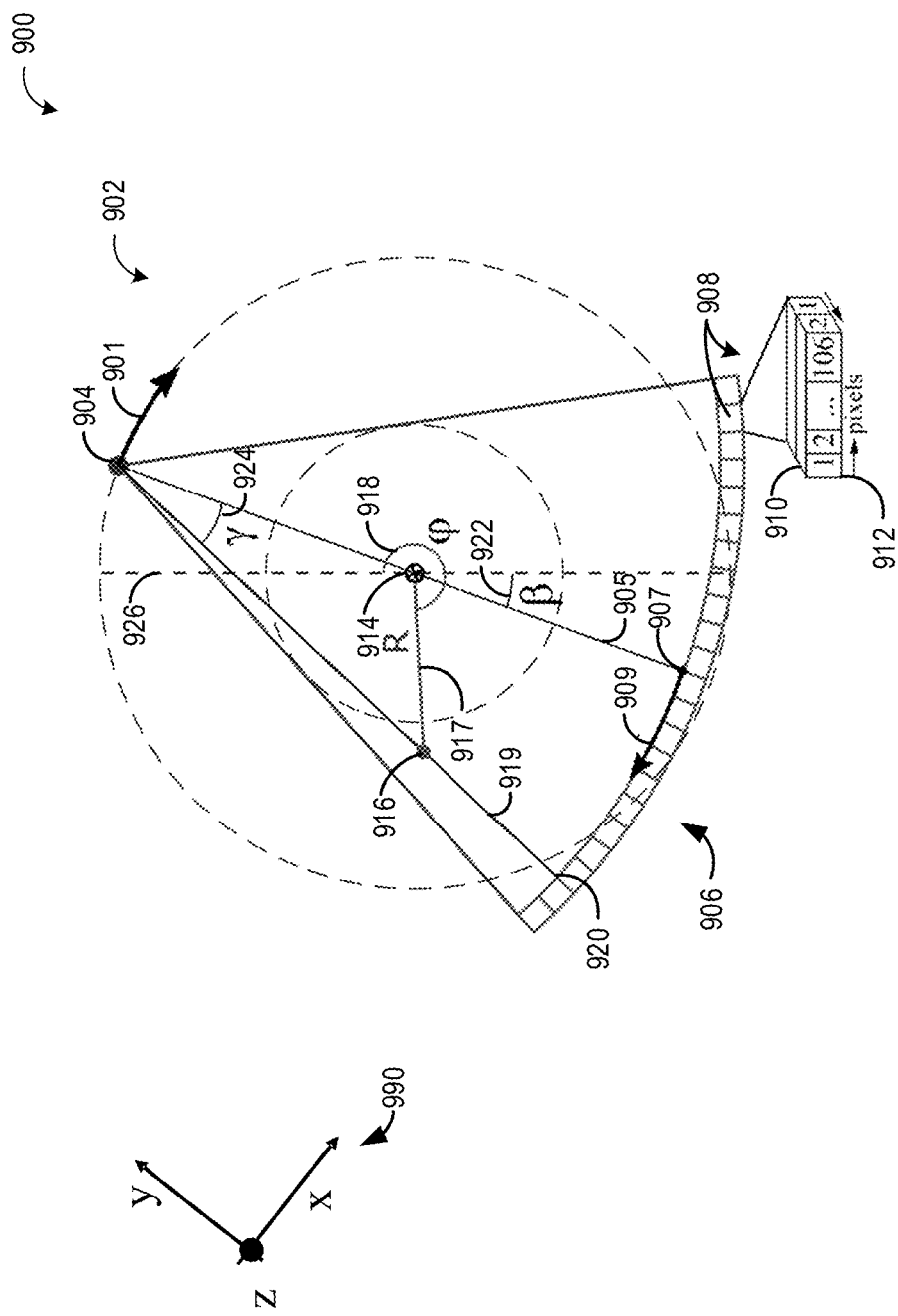
FIG. 9 shows an exemplary projection geometry used to calculate a position of a detector element of a detector array with respect to a wire phantom, in accordance with one or more embodiments of the present disclosure.

Referring to FIG. 9, a projection geometry diagram 900 illustrates a plurality of variables used to calculate the position of the wire. Projection geometry diagram 900 shows an exemplary CT system 902 (e.g., CT system 100 or imaging system 200) including an x-ray source 904 and a detector array 906, which may be a non-limiting example of detector array 400 of FIG. 4. X-ray source 904 and detector array 906 may be coupled to a gantry (e.g., gantry 104) that rotates in a direction 901 around an isocenter (point) 914, where isocenter 914 is half way between x-ray source 904 and a center point 907 of detector array 906, along an isocenter line 905. Detector array 906 includes a plurality of detector modules 908, where each detector module 908 includes a plurality of pixels 912. The pixels 912 may be organized in slices or chiclets 910. Each pixel 912 of detector array 906 may be referenced by a distance 909 from center point 907 along detector array 906 in an x dimension, and a row of the pixel 912 in a z dimension, based on references axes 990. A wire of a wire phantom is positioned within CT system 902 at a wire location 916.

FIG. 9 depicts the CT system at a point in time when the gantry has been rotated from an initial position, indicated by a line 926, by an angle of rotation 922 (β) of the gantry with respect to line 926. Wire location 916 (in reference to x-ray source 904 and/or detector array 906) may be measured based on distance R between wire location 916 and isocenter 914, indicated by a line 917, and an angle 918 (φ) between line 917 and line 926.

At the point in time depicted in FIG. 9, x-ray beams emitted by x-ray source 904 are detected at detector array 906. However, a pixel 920 may not detect an x-ray beam on a trajectory indicated by a line 919, which impinges on the wire at wire location 916. Line 919 is at an angle 924 (γ) with isocenter line 905. Thus, the angle location of pixel 920, γ, with respect to isocenter line 905 can be expressed as a function of a gantry rotation angle β based on R and φ, where R and φ are a measured wire position from the wire alignment step depicted previously. R is the wire distance from the isocenter, and φ is the wire angle from the isocenter line 905. SID is a Source-904 to-Isocenter 914 Distance, which is known by an engineering design. β 922 is a gantry rotation angle with respect to a gantry vertical Y axis 926.

$$\gamma(\beta) = \tan^{-1}\left(\frac{R \sin\alpha}{SID + R\cos\alpha}\right), \quad (1)$$
$$\alpha = \varphi - \pi - \beta$$

A design target location of pixel 920 may be provided by a parameterized detector model, as follows:

$$\gamma_{model}(X) = s(X)/SDD \quad (2)$$

where X represents a design model parameter; a design center location of each module and a pixel pitch within the module, from which a design location $\gamma_{model}$ of each pixel is calculated and modeled, and SDD is a Source-to-Detector-Distance between 904 and 907 that is known by design. The equations (1) and (2) are numerically inversed to include all pixels, p, in a minimization optimization between a measured and design (model) pixel location:

$$X^* = \mathrm{argmin}\|\beta_{meas}(p) - \beta_{model}(p)\|_{X,R,\varphi}, \quad (3)$$

As a result of a measurement described in FIG. 8, p vs β (pixel vs. view angle), is used to inverse equation (1). X* represents the fitting result of a module location and pixel pitch, from which all pixel locations may be extracted.

At 570, method 500 includes optionally generating alignment correction values from the measured positions of the detector elements, where the alignment correction values may be based on differences between the measured positions and design target positions of the detector elements.

At 572, method 500 includes storing the measured positions of the detector elements (or the alignment correction values) in a calibration vector for use in a subsequent scan of a subject, and method 550 ends. In other words, a calibration vector may be generated that includes a measured position of each detector element, or a correction value indicating an adjustment to be made to a position of the detector element to correct for the detected and quantified misalignment. The calibration vector may be used by method 500 of FIG. 5A to increase a quality of a reconstructed image of a subject during a subsequent scan, as described above.

Thus, a method is provided for correcting for misalignments in detector elements of a detector array of a CT system. The method may be used when mechanical calibration techniques may not be feasible, due to a size of the detector elements. The method relies on a wire phantom including a wire that is thicker than a detector element, unlike other wire phantoms, which may result in inconsistent detector readings. In a first step, the wire phantom is mounted on a table of the CT system, and a straightness and an angle of inclination of the wire are verified in accordance with procedures described herein. Once the straightness and correct alignment of the wire has been verified, and a position of each detector element of the detector array may be measured with respect to the wire. The measured positions may be stored in a calibration vector and applied during a subsequent scan of a subject, during image reconstruction, to correct for the misalignments.

By using the measured positions of the detector elements rather than design target positions from an engineering model of the detector array, the misalignments of the detector elements may be corrected during scans on subjects, and an image quality of resulting reconstructed images may be increased. An advantage of using the measured detector element positions is that mechanical alignment techniques may not be relied on to adjust the alignment of the detector elements. As a result, the method may be applied to detector arrays including smaller detector elements than can be aligned using the mechanical alignment techniques. Additionally, a calibration time, resource allocation, and cost of the CT system may be reduced, making the CT system more efficient. Thus, a functioning of the CT system may be improved, leading to reduced down time and faster and more accurate processing during calibration using the CT system. Further, higher quality images may be generated by the CT system as a result of applying the calibration method described herein, which may result in a higher percentage of successful diagnoses and desirable patient outcomes.

The technical effect of using a wire phantom to calibrate positions of detector elements within a detector array of a CT system is that a quality of an image reconstructed using the CT system may be increased.

The disclosure also provides support for a method for a computed tomography (CT) system, comprising: during a calibration of the CT system: measuring a position of a detector element of a detector array of the CT system using a wire of a wire phantom coupled to a table of the CT system, during a rotational scan performed using the CT system, during a subsequent scan performed on a subject using the CT system: applying the measured position of the detector element rather than a design target position of the detector element during reconstruction of an image from projection data acquired via the CT system, and displaying the reconstructed image on a display device of the CT system. In a first example of the method, the design target position of the detector element is provided by a model based on a detector design drawing and/or dimensions of the CT system. In a second example of the method, optionally including the first example, the measured position of the detector element is used to mechanically adjust the position of the detector element in the detector array. In a third example of the method, optionally including one or both of the first and second examples, the method further comprises: prior to measuring the position of the detector element with respect to the location of the wire, performing at least one of a first analysis of a straightness of the wire and a second analysis of an angle of inclination of the wire with respect to a z axis of the CT system along which the table is longitudinally aligned. In a fourth example of the method, optionally including one or more or each of the first through third examples, performing the first analysis of the straightness of the wire further comprises: performing a plurality of rotational scans, and incrementally adjusting a position of the wire along the z axis between each rotational scan of the plurality of rotational scans, during each rotational scan, measuring positions of detector elements positioned in a small number of center rows of the detector array with respect to the wire, and not measuring positions of detector elements positioned outside the small number of center rows of the detector array with respect to the wire, and comparing the measured positions of the detector elements at each rotational scan of the plurality of rotational scans to determine the straightness of the wire. In a fifth example of the method, optionally including one or more or each of the first through fourth examples, performing the second analysis of the angle of inclination of the wire with respect to the z axis of the CT system further comprises: performing a first rotational scan with the wire positioned at a first position along the z axis, performing a second rotational scan with the wire positioned at a second position along the z axis, the second position and the first position separated by a threshold distance, during each rotational scan, measuring positions of detector elements positioned in a small number of center rows of the detector array with respect to the wire, and not measuring positions of detector elements positioned outside the small number of center rows of the detector array with respect to the wire, and comparing the measured positions of the detector elements at the first rotational scan with the measured positions of the detector elements at the second rotational scan to determine the angle of inclination of the wire. In a sixth example of the method, optionally including one or more or each of the first through fifth examples, the small number is 2-4. In a seventh example of the method, optionally including one or more or each of the first through sixth examples, the method further comprises: in response to a result of the second analysis indicating that the angle of inclination of the wire is outside a second threshold deviation, displaying instructions to an operator of the CT system to adjust the angle of inclination of the wire via one or more tilt screws positioned on a phantom holder used to couple the wire phantom to the table. In a eighth example of the method, optionally including one or more or each of the first through seventh examples, the wire phantom is coupled to an edge of the table such that the location of the wire is outside a field of view of the detector array. In a ninth example of the method, optionally including one or more or each of the first through eighth examples, a diameter of the wire is at least three times a transaxial dimension of the detector element. In a tenth example of the method, optionally including one or more or each of the first through ninth examples, measuring the position of the detector element with respect to the location of the wire further comprises measuring the position of a detector element based on projection geometry and known physical characteristics of the CT system. In a eleventh example of the method, optionally including one or more or each of the first through tenth examples, measuring the position of the detector element with respect to the location of the wire further comprises fitting one of a parabolic function and a Gaussian function to measurements of signals generated at a plurality of neighboring detector elements including the detector element. In a twelfth example of the method, optionally including one or more or each of the first through eleventh examples, the method further comprises: calculating a respective alignment correction value for each detector element in the detector array, based on the measured position of the detector element, storing the calculated alignment correction values for all the detector elements in a calibration vector, using the calibration vector to correct positions of all the detector elements of the detector array during reconstruction of the image.

The disclosure also provides support for a computed tomography (CT) system, comprising a processor and a non-transitory memory including instructions that when executed, cause the processor to: perform a first series of rotational scans of a wire phantom to determine a straightness of a wire of the wire phantom, perform a second series of rotational scans of the wire phantom to determine an angle of inclination of the wire, in response to the straightness of the wire being within a first threshold deviation and the angle of inclination of the wire being within a second threshold deviation: during a calibration scan performed using the CT system: measure a position of each detector element of a detector array of the CT system with respect to a location of the wire, and during a subsequent scan performed using the CT system: apply the measured position of each detector element during reconstruction of an image from projection data acquired via the CT system, and display the reconstructed image on a display device of the CT system. In a first example of the system, performing the first series of rotational scans of the wire phantom to determine the straightness of the wire and performing the second series of rotational scans of the wire phantom to determine the angle of inclination of the wire further comprise adjusting a position of a table of the CT system on which the wire phantom is mounted along a z axis of the CT system along which the table is longitudinally aligned, between each rotational scan of the first series and second series of rotational scans, such that an imaging plane of a gantry of the CT system intersects with the wire at a different position along a length of the wire during each rotational scan. In a second example of the system, optionally including the first example, the wire phantom is coupled to the table such that the wire is outside a field of view of the detector array. In a third example of the system, optionally including one or both of the first and second examples, measuring the position of each detector element of a detector array of the CT system with respect to the location of the wire further comprises: collecting energy measurements at each detector element of the detector array during a full rotation of the calibration scan, during each frame of the full rotation: fitting a function to the energy measurements collected at a view angle corresponding to the frame, selecting a detector element of the detector array based on the function, measuring the position of the selected detector element with respect to the location of the wire. In a fourth example of the system, optionally including one or more or each of the first through third examples, measuring the position of the selected detector element with respect to the location of the wire further comprises measuring the position based on projection geometry and known physical characteristics of the CT system.

The disclosure also provides support for a wire phantom assembly for calibrating a computed tomography (CT) system, the wire phantom assembly comprising a wire phantom and a phantom holder, the phantom holder mountable on a table of the CT system and including one or more tilt screws that adjust an alignment of the wire phantom with the phantom holder, the wire phantom comprising a tube enclosing a braided wire molded with a plastic resin, the braided wire including a material with a high x-ray attenuation rate, the braided wire having a diameter at least three times a transaxial dimension of a detector element of the CT system. In a first example of the system, a straightness of the wire is maintained by tension of a spring.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for a computed tomography (CT) system, comprising:
   during a calibration of the CT system:
      measuring a position of a detector element of a detector array of the CT system with respect to a wire of a wire phantom coupled to a table of the CT system, during a rotational scan performed using the CT system; and
      storing the measured position of the detector element with respect to the wire in a non-transitory memory of the CT system; and
   during a subsequent scan performed on a subject using the CT system:
      applying the measured position of the detector element with respect to the wire rather than a design target position of the detector element during reconstruction of an image from projection data acquired via the CT system; and
      displaying the reconstructed image on a display device of the CT system.

2. The method of claim 1, wherein the design target position of the detector element is provided by a model based on a detector design drawing and/or dimensions of the CT system.

3. The method of claim 1, wherein the measured position of the detector element is used to mechanically adjust the position of the detector element in the detector array.

4. The method of claim 1, further comprising, prior to measuring the position of the detector element with respect to the wire, performing at least one of a first analysis of a straightness of the wire and a second analysis of an angle of inclination of the wire with respect to a z axis of the CT system along which the table is longitudinally aligned.

5. The method of claim 4, wherein performing the first analysis of the straightness of the wire further comprises:
performing a plurality of rotational scans, and incrementally adjusting a position of the wire along the z axis between each rotational scan of the plurality of rotational scans;
during each rotational scan, measuring positions of detector elements positioned in a small number of center rows of the detector array with respect to the wire, and not measuring positions of detector elements positioned outside the small number of center rows of the detector array with respect to the wire; and
comparing the measured positions of the detector elements at each rotational scan of the plurality of rotational scans to determine the straightness of the wire.

6. The method of claim 4, wherein performing the second analysis of the angle of inclination of the wire with respect to the z axis of the CT system further comprises:
performing a first rotational scan with the wire positioned at a first position along the z axis;
performing a second rotational scan with the wire positioned at a second position along the z axis, the second position and the first position separated by a threshold distance;
during each rotational scan, measuring positions of detector elements positioned in a small number of center rows of the detector array with respect to the wire, and not measuring positions of detector elements positioned outside the small number of center rows of the detector array with respect to the wire; and
comparing the measured positions of the detector elements at the first rotational scan with the measured positions of the detector elements at the second rotational scan to determine the angle of inclination of the wire.

7. The method of claim 6, wherein the small number is 2-4.

8. The method of claim 4, further comprising, in response to a result of the second analysis indicating that the angle of inclination of the wire is outside a second threshold deviation, displaying instructions to an operator of the CT system to adjust the angle of inclination of the wire via one or more tilt screws positioned on a phantom holder used to couple the wire phantom to the table.

9. The method of claim 1, wherein the wire phantom is coupled to an edge of the table such that the wire is outside a field of view of the detector array.

10. The method of claim 1, wherein a diameter of the wire is at least three times a transaxial dimension of the detector element.

11. The method of claim 1, wherein measuring the position of the detector element with respect to the wire further comprises measuring the position of the detector element with respect to the wire based on projection geometry and known physical characteristics of the CT system.

12. The method of claim 1, wherein measuring the position of the detector element with respect to the wire further comprises fitting one of a parabolic function and a Gaussian function to measurements of signals generated at a plurality of neighboring detector elements including the detector element.

13. The method of claim 1, further comprising:
calculating a respective alignment correction value for each detector element in the detector array, based on the measured position of the detector element;
storing the calculated alignment correction values for all the detector elements in a calibration vector;
using the calibration vector to correct positions of all the detector elements of the detector array during reconstruction of the image.

14. A computed tomography (CT) system, comprising a processor and a non-transitory memory including instructions that when executed, cause the processor to:
perform a first series of rotational scans of a wire phantom to determine a straightness of a wire of the wire phantom;
perform a second series of rotational scans of the wire phantom to determine an angle of inclination of the wire;
in response to the straightness of the wire being within a first threshold deviation and the angle of inclination of the wire being within a second threshold deviation:
during a calibration scan performed using the CT system:
measure a position of each detector element of a detector array of the CT system with respect to a location of the wire; and
during a subsequent scan performed using the CT system:
apply the measured position of each detector element during reconstruction of an image from projection data acquired via the CT system; and
display the reconstructed image on a display device of the CT system.

15. The CT system of claim 14, wherein performing the first series of rotational scans of the wire phantom to determine the straightness of the wire and performing the second series of rotational scans of the wire phantom to determine the angle of inclination of the wire further comprise adjusting a position of a table of the CT system on which the wire phantom is mounted along a z axis of the CT system along which the table is longitudinally aligned, between each rotational scan of the first series and second series of rotational scans, such that an imaging plane of a gantry of the CT system intersects with the wire at a different position along a length of the wire during each rotational scan.

16. The CT system of claim 15, wherein the wire phantom is coupled to the table such that the wire is outside a field of view of the detector array.

17. The CT system of claim 14, wherein measuring the position of each detector element of the detector array of the CT system with respect to the location of the wire further comprises:
collecting energy measurements at each detector element of the detector array during a full rotation of the calibration scan;
during each frame of the full rotation:
fitting a function to the energy measurements collected at a view angle corresponding to the frame;
selecting a detector element of the detector array based on the function;
measuring the position of the selected detector element with respect to the location of the wire.

18. The CT system of claim 17, wherein measuring the position of the selected detector element with respect to the location of the wire further comprises measuring the position based on projection geometry and known physical characteristics of the CT system.

19. A wire phantom assembly for calibrating a computed tomography (CT) system, the wire phantom assembly comprising a wire phantom and a phantom holder, the phantom holder mountable on a table of the CT system and including one or more tilt screws that adjust an alignment of the wire phantom with the phantom holder, the wire phantom comprising a tube enclosing a braided wire molded with a plastic resin, the braided wire including a material with a high x-ray attenuation rate, the braided wire having a diameter at least three times a transaxial dimension of a detector element of the CT system.

20. The wire phantom assembly of claim 19, wherein a straightness of the wire is maintained by tension of a spring.

* * * * *